United States Patent Office 3,115,502
Patented Dec. 24, 1963

3,115,502
METHOD OF ISOMERIZING BASICALLY SUBSTITUTED STEREOISOMERIC THIOXANTHENES
Reinhard Schläpfer and Hans Spiegelberg, Basel, Switzerland, assignors to Hoffmann-La Roche Inc., Nutley, N.J., a corporation of New Jersey
No Drawing. Filed June 1, 1960, Ser. No. 33,084
Claims priority, application Switzerland June 19, 1959
6 Claims. (Cl. 260—328)

This invention relates to novel chemical processes, and especially to novel processes for isomerization of certain geometrically asymmetric chemical compounds, said compounds being subjected to isomerization either as a single stereoisomeric form or in the form of stereoisomeric mixtures containing an excess of one stereoisomer.

More particularly, the invention relates to processes which comprise heating geometrically asymmetric 9-(basically substituted-alkylidene)-thioxanthenes in the presence of a strongly basic agent.

The compounds referred to above, i.e. 9-(basically substituted-alkylidene)-thioxanthenes, including geometrically asymmetric species thereof, are known in the prior art; being described, for example, in German Federal Republic "Auslegeschrift" 1,044,103 of November 20, 1958. In the case of geometrical asymmetric compounds of this class, one stereoisomer may be preferred, e.g. because of greater economic value: for instance, as a medicinal agent. Thus, trans-2-chloro-9-(ω-dimethylamino-propylidene)-thioxanthene [M.P. 98° C., M.P. of the hydrochloride 225° (corr.)], is a valuable medicinal agent, being used as a tranquilizer and antiemetic agent, whereas the corresponding cis isomer (M.P. 44° C., M.P. of the hydrochloride 209° C.) is not useful for these indications. When an excess inventory of an undesired isomer (e.g., in the case discussed above: the cis isomer) accumulates, it may be desirable to subject said excess isomer to a process whereby it is converted to the more desired steric form (e.g., in the case discussed above: the trans form). According to the present invention, the conversion is accomplished by heating the undesired isomer (either as the single stereoisomer or in admixture with a lesser proportion of the other stereoisomer) with a strongly basic agent. The product of this conversion process is an isomeric mixture containing the two stereoisomers in approximately equal proportions. The more desired steric form can be separated from said mixture, and the residual less desired stereoisomer can then again be subjected to the conversion process of the invention.

The invention comprehends broadly the use of strongly basic isomerization agents, such as alkali metal hydroxides (particularly sodium hydroxide and potassium hydroxide), alkali metal lower alkoxides (particularly sodium— and potassium methoxides and—ethoxides), alkaline earth metal hydroxides (e.g. calcium hydroxide, barium hydroxide), alkaline earth metal lower alkoxides (e.g. calcium— and barium methoxides and—ethoxides), alkali metal amides and alkaline earth metal amides (e.g. sodium amide and calcium amide, in dimethylformamide). However, it is preferred to use alkali metal hydroxides and alkali metal lower alkoxides, particularly those specifically referred to above.

Similarly, the invention is applicable broadly to any geometrically asymmetric 9-(basically substituted)-thioxanthene. However, it is especially applicable to such asymmetric compounds wherein the ar-nuclear substituents are selected from the group consisting of alkyl, aralkyl, aryl, alkoxy, aralkoxy, aryloxy, alkylthio, aralkylthio, arylthio, halo, acyl, amino, hydroxyl and carboxyl. In an especially preferred embodiment, the processes of the invention are applied to the isomerization of a geometrically asymmetric compound represented by the general formula

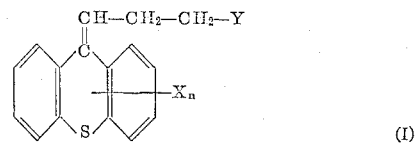

wherein

Y represents a basic substituent selected from the group consisting of di(lower alkyl)amino, 1-piperidyl, 4-morpholyl, 1-piperazyl and 1-hydroxyethyl-4-piperazyl;
X represents an ar-nuclear substituent selected from the group consisting of halogen, lower alkyl and lower alkoxy; and
$n$ represents a small integer from 1 to 2, inclusive.

In order to avoid splitting off the basic substituent in the 9-side chain (e.g., in the compounds of above Formula I: the substituent Y), and also in order to avoid resinification of the resulting decomposition product, it has been found advisable to conduct the isomerization reaction in an inert organic polar solvent, and in the presence of an organic base corresponding to the basic substituent in the 9-side chain (e.g., in the case of a starting material under Formula I above: an organic base Y—H, wherein Y represents the same substituent as in said starting material). Any inert organic polar solvent can be employed, e.g. lower alkanols, dimethylformamide, and the like; but it is preferred to employ methanol or ethanol when working with an alkali hydroxide or an alkali methoxide or ethoxide as the strongly basic agent; and to employ dimethylformamide when using an alkali amide as the strongly basic agent. The organic base, e.g., Y—H referred to above, is ordinarily employed in an amount of from about five to about ten molar proportions with reference to the material to be isomerized. Inasmuch as too gentle heating results in very long reaction periods, whereas heating at very high temperatures results in discoloration of the reaction mixture, it is preferred to conduct the heating at temperatures between about 50° C. and about 200° C.; and still more preferably, at temperatures between about 60° C. and about 180° C.

The invention is further disclosed in the following examples, which are illustrative but not limitative thereof. Temperatures are stated in degrees centigrade.

Example 1

3 g. of cis-2-chloro-9-(ω-dimethylamino-propylidene)-thioxanthene of M.P. 44°; a solution of 0.5 g. of sodium in 20 ml. of methanol; and 5 ml. of dimethylamine are heated in a sealed tube for 12 hours at 60°. The solvent is driven off, the residue is taken up in 30 to 40 ml. of ether, the ether is washed free of alkali with water and then, after drying over a little sodium sulfate, the ether is driven off. The syrupy residue contains 1.4 to 1.5 g. of trans-2-chloro-9-(ω-dimethylamino-propylidene)-thioxanthene together with 1.5 g. of the cis isomer. In order to isolate the readily crystallizable trans isomer, the syrupy residue is diluted with 4.5 ml. of petroleum ether of boiling range 80–110°, and the mixture is allowed to stand in the refrigerator for 3 to 4 days. Upon recrystallization of the crude crystals from 1.5 to 2 ml. of methanol, there is obtained 0.75 g. of trans-2-chloro-9-(ω-dimethylamino-propylidene)-thioxanthene of M.P. 98°.

Example 2

4 g. of a mixture of the cis and trans isomers of 2-chloro-9-(ω-dimethylamino-propylidene)-thioxanthene (containing 20% of trans isomer, the remainder being the cis isomer) is heated in a sealed tube at 110° for 5 hours, in the presence of 0.15 g. of sodium hydroxide, 6 ml. of dimethylamine and 25 ml. of methanol. Upon evaporation of the solvent there is obtained a syrupy residue which contains 42% of the trans isomer (as determined by infrared analysis). The syrupy material is worked up according to the indications in Example 1 in order to isolate crystalline trans-2-chloro-9-(ω-dimethylamino-propylidene)-thioxanthene.

We claim:

1. A process for the isomerization of a geometrically asymmetric compound of the formula

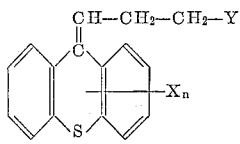

wherein

Y represents a basic substituent selected from the group consisting of di(lower alkyl)amino, 1-piperidyl, 4-morpholyl, 1-piperazyl and 1-hydroxyethyl-4-piperazyl;

X represents an ar-nuclear substituent selected from the group consisting of halogen, lower alkyl and lower alkoxy; and $n$ is an integer selected from the group consisting of 1 and 2, inclusive;

which comprises heating at temperatures between about 50° C. and about 200° C. said compound, in solution in a solvent selected from the group consisting of lower alkanol and dimethylformamide, in the presence of an agent selected from the group consisting of alkali metal hydroxides, alkali metal lower alkoxides, alkaline earth metal hydroxides, alkaline earth metal lower alkoxides, alkali metal amides and alkaline earth metal amides and of an organic base of the formula Y—H, wherein Y is the same substituent as in said compound.

2. A process for the isomerization of material selected from the group consisting of the cis and the trans isomers of 2-chloro - 9 - (ω-dimethylamino-propylidene) - thioxanthene and mixtures thereof containing the one isomer in excess over the other which comprises heating said material, in solution in a lower alkanol, and in the presence of dimethylamine and an alkali metal-containing strong base, at a temperature between about 50° C. and about 200° C.

3. A process according to claim 2 wherein said strong base is sodium hydroxide.

4. A process according to claim 3 wherein the temperature is between about 60° C. and about 180° C.

5. A process according to claim 2 wherein said strong base is sodium lower alkoxide.

6. A process according to claim 5 wherein the temperature is between about 60° C. and about 180° C.

References Cited in the file of this patent

UNITED STATES PATENTS 2,951,082   Sprague et al.  ---------- Aug. 30, 1960
2,957,880   Rometsch  -------------- Oct. 25, 1960

FOREIGN PATENTS 1,044,103   Germany  -------------- Nov. 20, 1958

OTHER REFERENCES

Noller: Chemistry of Organic Compounds, 2nd edition, pages 354 to 357, W. B. Saunders Company, Philadelphia, 1957.

Fieser et al.: Organic Chemistry, 3rd edition, pages 278 to 287, D. C. Heath and Co., third printing, 1958.